Sept. 5, 1967 D. J. YOMINE 3,339,859

TAPE REEL

Filed Nov. 29, 1966

INVENTOR
DANIEL J. YOMINE

BY Anderson, Luedeka, Fitch, Even & Tabin
ATTORNEYS 3,339,859
TAPE REEL

Daniel J. Yomine, Chicago, Ill., assignor to Ampex Corporation, Redwood City, Calif., a corporation of California

Filed Nov. 29, 1966, Ser. No. 597,636
5 Claims. (Cl. 242—74)

This invention relates to a tape reel and more particularly to a reel suitable for use as a take-up or supply reel for machines such as magnetic tape recorders.

Normally, in threading a tape recorder, it is desirable that a leading end of the tape from a supply reel be easily connected to a take-up reel. Any means provided for connecting the tape to the reel should permit the recorder to operate in any position without tape dropping off the reel and should permit the reel to be operated in an inverted position. Hooks or special leaders are undesirable for fastening the end of the tape to the reel since the tape would break unless the tape recorder is equipped with a mechanism to stop rotation of the reel upon completion of a rewinding operation. Slots or undercuts have been provided in the reel flanges or hubs to receive the leading end of the tape but considerable difficulty has been often encountered in manipulating the leading end of the tape through such a slot or undercut.

An arrangement of a take-up mechanism of a recorder which permits easy connection of the tape thereto is described in the patent to Ellmore, No. 3,265,318, entitled, "Magnetic Tape Machine." The patented take-up mechanism requires, for vertical operation of the recorder, a cover to prevent the tape lead from falling out. Also, the take-up mechanism cannot be turned over for recording or playing back the opposite hand tracks on single direction recorders.

Accordingly, a general object of the invention is to provide a reel, which is uniquely constructed to facilitate threading and retention of the tape on the reel. Another object is the provision of a reel which is provided with a means for permitting tape to be connected to the reel without requiring a precise orientation of the reel or of the tape. Still another object of the invention is to provide a tape reel which may be oriented in any plane of operation and which may be inverted.

Other objects and advantages will become readily apparent from the following detailed description and accompanying drawings wherein.

Figure 1:
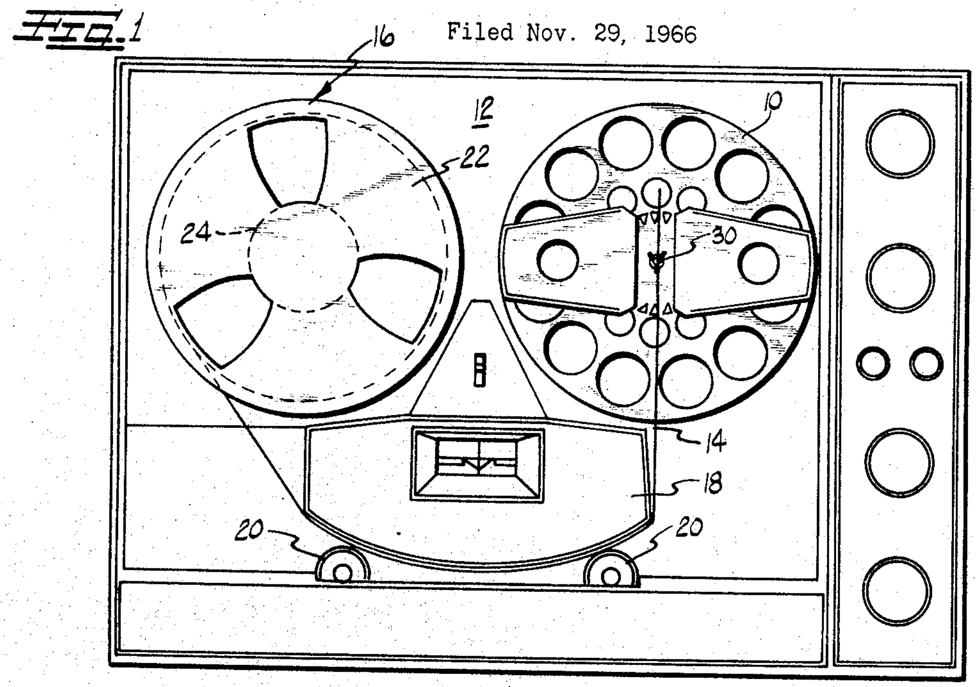
FIGURE 1 is a plan view of a tape recorder including one embodiment of a tape reel in accordance with the present invention.

As shown in FIGURE 1 for purposes of illustration, the invention is embodied in a reel 10 for use in a tape recorder 12 in which an elongated strip of tape 14 is unwound from a reel 16 in a supply position and is wound on the reel 10 in a take-up position. In the illustrated recorder, the tape 14 between the supply reel 16 and the take-up reel 10 passes over a record, reproduce and erase head (not shown) which are covered by a housing 18. A pair of pinch rolls 20 are positioned adjacent the housing 18 at spaced locations for pressing the tape against respective capstans (not shown) for the purpose of feeding the tape in either direction.

The supply reel 16 is of standard construction with two axially spaced flanges 22 of circular configuration attached to a central hub 24. The take-up reel 10, on the other hand, has only a single, circular flange 26 of a suitable material such as plastic, which is disposed downwardly and in a horizontal position when the recorder 12 is horizontal. A plurality of apertures 27 are provided in the flange 26 with their axis on two concentric circles to reduce the weight of the reel. A slotted opening 28 is formed in the flange 26 at the axis of the take-up reel 10 to receive a spindle 30 (FIG. 1) which extends into an upwardly extending annular boss 32 (FIG. 3) on the flange 26. The central portion of the lower face of the flange is provided with a circular platform 33 which, when the reel is disposed on the spindle 30, rests on a turntable (not shown) associated with the spindle.

Figures 2, 4:
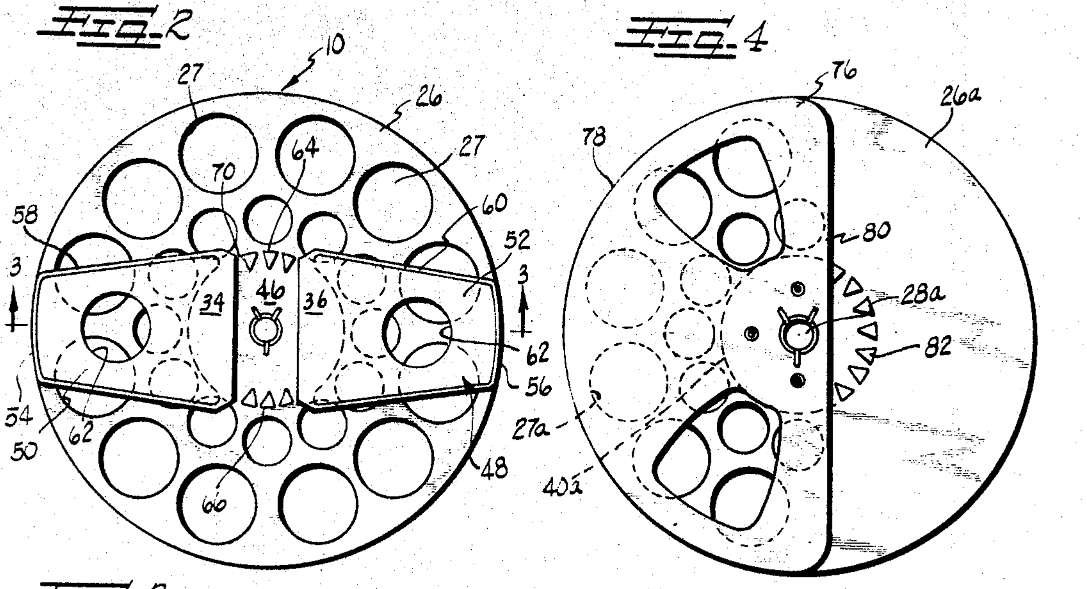
FIGURE 2 is an enlarged plan view of the reel separated from the recorder shown in FIGURE 1.
FIGURE 4 is a plan view of another embodiment of the reel in accordance with the invention.
Figure 3:
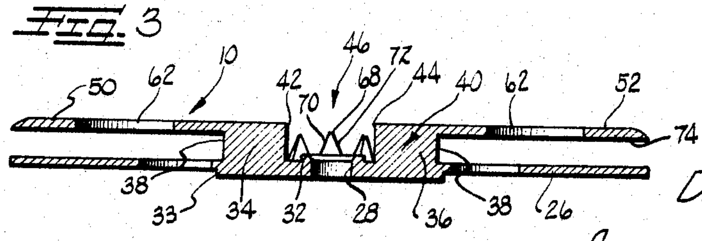
FIGURE 3 is an enlarged sectional view taken substantially along the line 3—3 of FIGURE 2.

As shown in FIGURES 2 and 3 a pair of spaced hub sections 34 and 36 are integrally formed with and extend axially from the flange 26. Arcuate outer walls 38 on the hub sections are spaced radially from the axis of take-up reel 10 and form two sections of a circumferential hub or support 40 for the coil of tape during the winding of the latter. Inner walls 42 and 44 of the hub sections 34 and 36, respectively, extend axially from the upper side (FIG. 3) of the flange 26 to form a vertical slot or central opening 46 extending diametrically across the hub 40. This opening 46 between the hub sections 34 and 36 is of considerable width, as contrasted to the thickness of the tape for a purpose hereinafter described in detail.

The take-up reel 10 is provided with means 48 for retaining the coil of tape on the reel when the reel is flipped over and placed at the supply position with the circular flange 26 now positioned over the coil of tape. In the illustrated embodiment, the means 48 for retaining the coil of tape on the take-up reel 10, is an opposite flange comprising flange sectors 50 and 52 which extend radially outward from the hub sections 34 and 36, respectively, and are spaced axially from the main flange 26 by a distance to accept the usual width of tape and to support the coil of tape against axial sliding from the hub 40. In the exemplary embodiment of the invention, only two flange sectors 50 and 52 are provided and they are disposed diametrically opposite one another with their outer free ends terminating in arcuate end walls 54 and 56, respectively, spaced at a diameter which is the same as the outside diameter of the main flange 26. Herein, the arcuate walls 54 and 56 extend only for limited arcs as compared with the total 360° outer circular wall of the main flange 26. From these arcuate walls 54 and 56 of the flange sectors 50 and 52, spaced side walls 58 and 60 extend to the hub sections 34 and 36. An aperture 62 large enough in area to accept the end of a thumb is provided in each flange sector 50, 52 to permit easy engagement of the reel by the user during orientation of the reel prior to threading of the tape.

When the reel 10 is in the take-up position these flange sectors leave fully exposed a first set of teeth 64 and a circumferentially spaced, second set of teeth 66 with the radial slot 46 extending therebetween so that a leading end of a tape may be inserted edgewise across the slot 46 and between adjacent teeth of the sets of teeth 64 and 66 to span the hub area of the reel. Herein, the flange sectors 50 and 52 leave approximately three-fourths of the space of the other flange 26 exposed and also expose the sets of teeth 64 and 66 so that the tape may be held at a number of different inclinations and slipped or threaded between the relatively wide spaces between adjacent teeth.

The teeth 64 and 66 are formed integrally with an project axially from the main flange towards the flange sectors 50 and 52. The teeth 64 and 66 in this instance, are formed in the shape of tetrahedrals having rounded tops 68 (FIG. 3). An edge 70 of each tooth leads in the direction of rotation of the reels and is perpendicular to the flange 26 while the other edges 72 are at an acute angle to the flange 26. Thus, when the reel 10 is rotated in the counterclockwise direction in FIG. 1, the tape engages a leading edge of one tooth 64 and 66, of each set without exerting a lifting force on the tape which would tend to shift the tape axially upward and to expel the same from the teeth. The rounded tops 68 on the teeth and their sloped edges 72 facilitate the edgewise insertion of the tape between adjacent teeth by affording relatively wide gaps at the tops of the teeth.

The tops 68 of the teeth 64 and 66 terminate at a horizontal plane defined by the inner sides 74 of the respective flange sectors 50 and 52. The coil of tape winds about the radially outer sides of the teeth which are disposed equidistantly from the axis of the main flange and thus form, together with hub sections 32 and 38, the hub 40 about which the coil of tape will wind or unwind.

When the reel 10 is used in the illustrated machine 12, the reel 10 is disposed in a generally horizontal plane with its flange 26 down and the flange sectors 50 and 52 up so that the coils of tape are supported by the lower flange 26 during the winding of the coil. In this orientation, a tape may be attached to the reel by edgewise insertion through the wide slot 46 between the hub sections 34 and 36 and into the slots between spaced teeth of opposite sets of teeth 64 and 66.

With the leading tape end pushed downwardly between pairs of teeth of the sets 64 and 66 and extending across the hub 40, when the recorder is placed in its record or playback mode of operation, the spindle 30 and its associated turntable turn the reel 10, thus, causing the leading edges 70 of the teeth to exert a pull on the tape and wind the same on the arcuate hub wall 38. On the other hand, it is possible to employ the reel 10 with the flange sectors 50 and 52 faced down, and to attach the leading end of a tape by endwise insertion radially between one pair of the teeth 54 across the main flange 26 through the space between an opposite pair of the teeth 66.

The embodiment of the reel shown in FIGURE 4 is generally similar to that shown in FIGURES 1 to 3 except that only one upper flange sector 76 is provided. Corresponding parts are indicated with the same reference numeral and the subscript *"a."* The upper flange sector 76 includes an arcuate end wall 78 which extends for an arc slightly greater than 180°. From the ends of the end walls 78 extends a side wall 80, the side wall being radially spaced from the slotted opening 28*a*. The part of the hub 40*a* which is not covered by the upper flange sector 76 is formed by circumferentially spaced teeth 82 which are similar to the teeth described in connection with FIGURES 1 to 3. To counterbalance the upper flange sector, apertures 27*a* are only provided in the portion of the lower flange 26*a* covered by the upper flange sector 76.

From the foregoing it will be seen that the present invention affords a reel which is uniquely constructed to facilitate the threading of the tape on the reel, yet which is capable of being flipped over and used as a supply reel. The reel, however, is preferably used as a take-up reel because the teeth are exposed to facilitate the threading of the tape.

While preferred embodiments have been shown and described, it will be understood that there is no intent to limit the invention by such disclosures but, rather, it is intended to cover all modifications and alternative constructions falling within the spirit and scope of the invention as defined in the appended claims.

What is claimed is:

1. A reel adapted for receiving a leading end of a tape and for supporting the tape when wound in a coil comprising, the combination of a flange having a circular configuration with a central axis, a plurality of teeth projecting axially from said flange and spaced circumferentially about said axis, hub means including a wall extending axially from the flange and aligned circumferentially with the teeth, and a flange sector attached to said hub means and axially spaced from the flange and extending radially from the axis for supporting the coil of tape between the flange and the sector.

2. A reel in accordance with claim 1, wherein two of said hub means are provided in spaced circumferential relation, and a flange sector is attached to each hub means.

3. The combination of claim 1 in which the teeth are in the shape of tetrahedrals with a leading axial edge of each tooth disposed normal to the plane of the first flange.

4. The combination of claim 2 in which the flange sectors cover less than one-half of the area occupied by the flange.

5. A take-up reel for an elongated strip such as a magnetic tape comprising the combination of a circular flange having a central axis, hub means extending axially from the flange and including a plurality of teeth spaced circumferentially on said flange to receive one end of a tape between spaced pairs of teeth, and at least one flange sector secured to said hub means and spaced axially from the circular flange to receive the tape between the flange and flange sector, said flange sector leaving exposed a plurality of said spaced pairs of teeth.

References Cited

UNITED STATES PATENTS

| | | | |
|---|---|---|---|
| 2,991,955 | 7/1961 | Post | 242—74 |
| 3,265,318 | 8/1966 | Ellmore | 242—74 |

FRANK J. COHEN, *Primary Examiner.*

N. L. MINTZ, *Examiner.*